March 10, 1970 K. E. SHILL 3,500,363

SCANNING APPARATUS

Filed July 11, 1966

KARL E. SHILL
INVENTOR.

BY Ronald P. Shipman

AGENT

United States Patent Office 3,500,363

Patented Mar. 10, 1970

3,500,363

SCANNING APPARATUS

Karl E. Shill, Fremont, Calif., assignor to The Singer Company, a corporation of Delaware Filed July 11, 1966, Ser. No. 564,348
Int. Cl. G11b 5/48, 5/00
U.S. Cl. 340—174.1 6 Claims

ABSTRACT OF THE DISCLOSURE

A magnetic record disc and a transducer mounting mechanism for moving the transducer between tracks on the disc. The mounting mechanism is pivoted at a location that provides low inertia for the mechanism and provides compensation for differing signal strengths at different radially spaced tracks of the disc.

The present invention concerns an improved information storage medium scanning apparatus and more particularly relates to an apparatus for moving an electromagnetic transducer between a plurality of translating positions with respect to a rotating disc having surfaces onto, and from which information may be recorded and transcribed, respectively.

In the past, there has been developed various forms of information storages devices known as magnetic disc files for compact storage and rapid retrieval of information. In general, a magnetic disc file comprises one or more rotatably mounted disc-shaped base members, each side of which is coated with a layer of material that will record information in response to a magnetic field induced from a writing transducer that receives electrical signals indicative of information, store the information for an indefinite period of time, and induce electrical signals in a reading transducer.

There have been developed various types of scanning or indexing systems for mounting and moving a reading and writing transducer or translator into various information translating positions with respect to the disc. One type of scanning system mounts the transducer for movement in a straight-line path of travel radially across the surface of the rotating disc. Another type of scanning system mounts the transducer on a long, pivoted, cam-operated arm for movement in an arc-like path of travel across the surface of the disc.

In both of the just-mentioned prior art developed scanning system, operation or access time to index the transducer from one translating position to another has been found to be relatively large, due to the relatively large mass or inertia of the moving parts of the system. In the straight-line path of travel mounting system, the parts making up the system must be formed within very narrow design tolerances which, of course, increase the initial cost and maintenance of the system. Another problem encountered with straight-line movement systems and long pivoted cam-operated arm systems is the unequal signal strength of the signals obtained when reading information stored at radially different spacings from the center of the disc. The strength of the information signal generated, or induced, in the reading transducer is dependent on the linear speed of the magnetic material being traversed by the transducer and, of course, with the disc rotated at a constant angular velocity, the linear speed of any point on the disc is a function of its radial distance from the center of the disc.

It is, therefore, an object of the present invention to provide an improved apparatus for scanning a magnetic record disc.

Another object is to provide an improved mounting and indexing means for a magnetic record disc transducer.

A still further object of the present invention is to provide an easily and economically fabricated scanning means for a magnetic record disc transducer.

Briefly stated, the objects of the present invention are accomplished in an information handling apparatus, such as a magnetic disc file, by mounting an electromagnetic transducer on a frame which is pivotable about an axis extending parallel with the axis of the record disc. The pivotable frame is provided with a curved surface, and a pair of flexible inextensible bands are trained over the curved surface and connected with a driving means, such as a capstan, connected to a stepping motor. Controlled angular movement of the capstan pulls on one or the other of the inextensible bands which, in turn, effects pivoting of the transducer mounting frame and, accordingly moves the electromagnetic transducer in a predetermined curved path across the surface of the magnetic record disc. The electromagnetic transducer (which is of the usual type), having pole pieces separated by a nonmagnetic slot or gap, is oriented on the frame such that the gap is traversed by the medium providing maximum magnetic flux when located near the center of the disc, and minimum flux when located near the outer periphery of the disc. In this manner, since the speed of the medium and hence change in magnetic flux traversing the gap is greater near the outer periphery of the disc than near the center, substantially constant signal strength is generated by the transducer regardless of the position of the transducer with respect to its radial spacing from the center of the disc.

The features of novelty that are considered characteristic of this invention are set forth with particularity in the appended claims. The organization and method of operation of the invention may best be understood from the following description when read in connection with the accompanying drawings in which:

Figure 1:
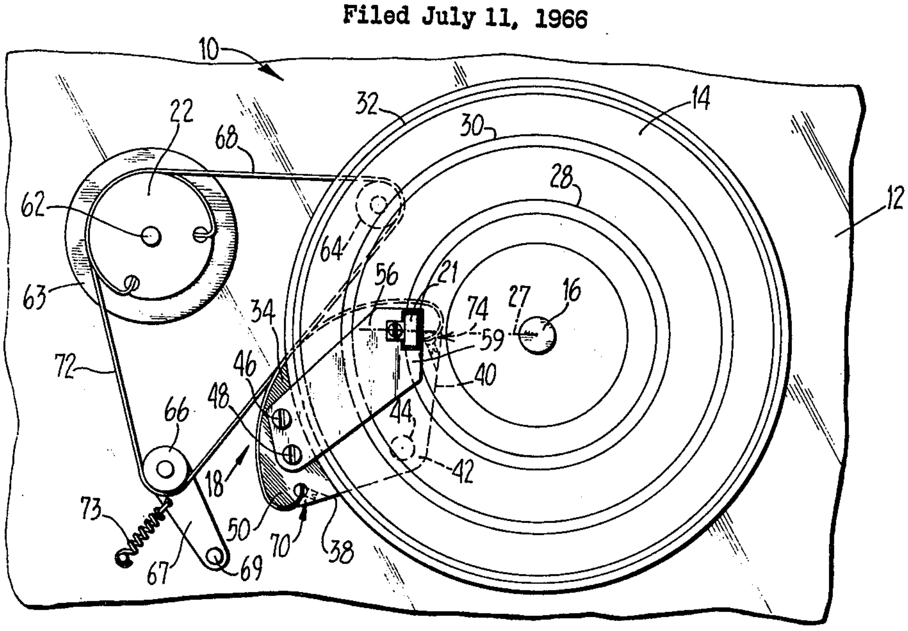
FIG. 1 is a top plan view of a magnetic disc file apparatus incorporating the present invention.

In FIG. 1 there is shown an information handling apparatus or magnetic disc file 10 comprising: a stable base 12; an information storage medium or magnetic record disc 14 attached to a rotatable drive shaft 16 suitably journalled on the stable base 12 and rotated at a substantially constant angular speed by means of interconnection with a prime mover (not shown), such as an electric motor; a disc-scanning apparatus or transducer mounting and indexing means 18 upon which is mounted a pair of transducers or translators 20 and 21 (the lower transducer 20 being shown in FIG. 2 only); and a driving capstan 22 mounted on a stepping motor 63.

Briefly described, the magnetic record disc 14 is a substantially flat circular-shaped base member having opposite sides coated with a thin film of a magnetizable medium or material, such as gamma ferric oxide particles, uniformly dispersed in a binding medium. Specific small areas of the magnetizable medium on both sides of the disc may be oriented in an intelligence pattern (thus recording information therein) by generating a magnetic field across a small slot or gap in an electromagnetic transducer disposed closely adjacent the moving surface of the disc as the disc is rotated relative to the transducer. Information is read from the disc by means of electrical signals induced in the transducer as the recorded areas of the disc are moved past the air gap of the transducer. Since the details of the operation and construction of magnetizable discs and associated transducers are well-known in the art to which the present invention pertains, they are described only to the extent necessary for a complete understanding of the novel invention described in this application. The principles of a magnetic disc and electromagnetic transducer operating in combination with each other for translation of data are adequately described in Digital Computer Components and Circuits by R. K. Richards, D. Van Nostrand Co., Inc., Princeton, N.J. (copyright 1957, by D. Van Nostrand Co., Inc.) in chapter 7, pages 314 to 353.

Figures 2, 3, 4:
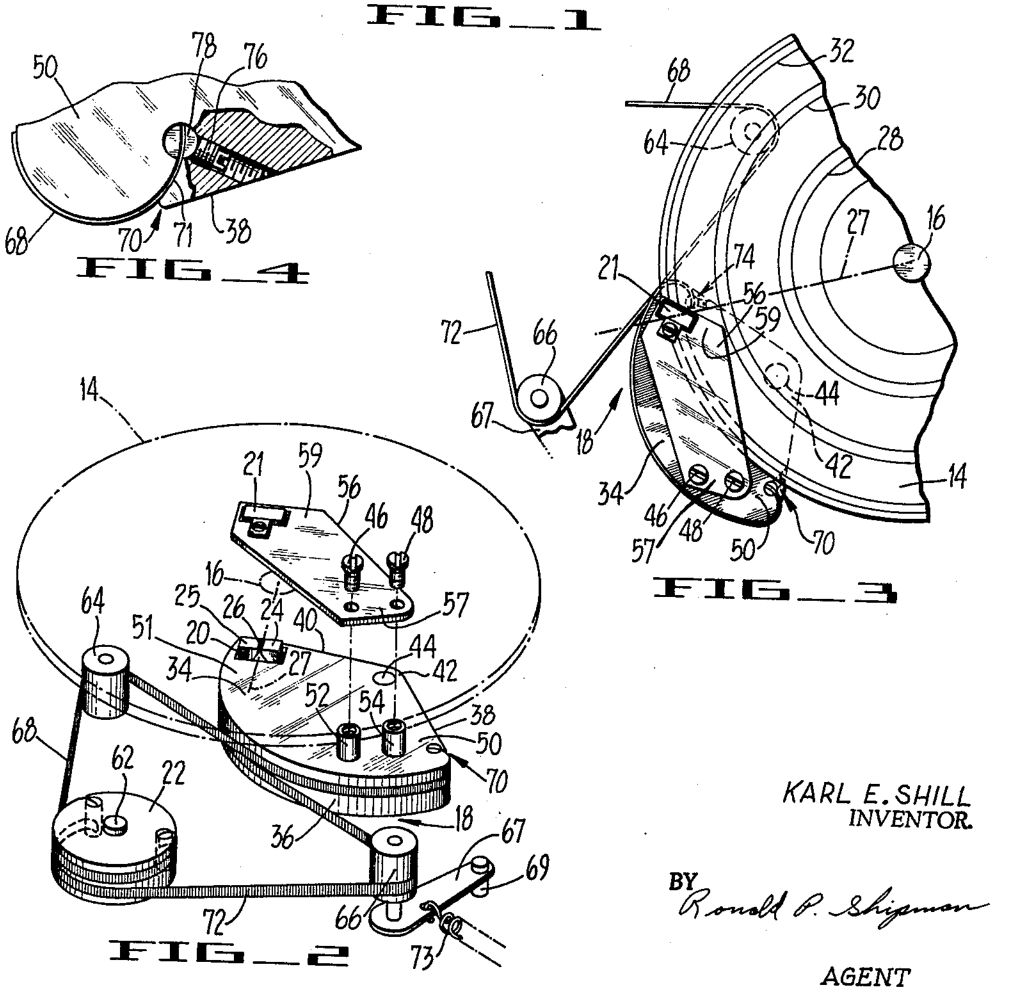
FIG. 2 is a partially exploded perspective view illustrating the principles of the present invention.
FIG. 3 is a partial top plan view illustrating the operation of the present invention.
FIG. 4 is a fragmentary view on an enlarged scale showing the band connecting means of the present invention.

The recorded areas having stored information may be considered as located in either closed concentric bands or tracks, three of which are indicated by way of example in FIGS. 1 and 3 as inner track 28, middle track 30, and outer track 32, or a single spiral track having ends near the outer periphery and the inner portion of the disc. For the purpose of the ensuing discussion, radially adjacent portions of a single spiral track may be considered the same as radially adjacent portions of radially spaced concentric tracks. It is significant that track portions spaced different radial distances from the center of the disc are moved with different linear speeds. The strength of an electrical signal induced in a transducer whose gap is oriented at a constant angle with respect to a radius line A–A′ passing from the center or axis of the disc 14 to the center of the gap, is directly proportional to the linear speed at which the particular data track portion moves pass the transducer.

The scanning apparatus 18 includes a generally flat light weight lower sector member or plate 34 having an outwardly facing curved wall or surface 36 (shown best in FIG. 2) and sidewalls 38 and 40 which converge toward each other from opposite ends of the curved wall to an apex or rear corner portion 42. The rear corner portion 42 is fixed to a pivot shaft 44, which is suitably mounted on the base 12 beneath the disc 14 at a location radially inwardly of the outer periphery of the disc, for pivotal movement about an axis extending parallel with the axis of the disc 14. The lower sector plate 34 is thus pivotable about the axis of shaft 44 in a plane parallel with the plane of the disc 14 between an inner position as shown in FIG. 1 and an outer position as shown in FIG. 3. The curvature of curved wall 36 is shown in the figures as being generally circular with its center or axis of curvature coincident with the axis of shaft 44.

The outer sidewall 38 and curved wall 36 join each other at an outer corner portion 50, which extends radially outwardly of the outer periphery of the disc 14 when the lower sector plate 34 is in its innermost position, as shown in FIG. 1. A pair of upper sector plate mounting posts 52 and 54 (shown in FIG. 2 only) are suitably secured to, and extend upwardly from, the outer corner portion 50 of the lower sector plate to a location a short distance above the plane or upper surface of the disc 14. A substantially flat relatively thin upper transducer mounting plate 56 has a proximal end 57 secured to the upper ends of the posts 52 and 54 by suitable fastening means, such as a pair of screws 46 and 48, and a distal end 59 disposed over the upper surface of the disc 14 at about the same radial distance from the axis of pivot shaft 44 as the radially inner portion 51 of the lower sector plate 34. Thus, the upper transducer mounting plate 56 moves with the lower sector plate 34 between an inner position, shown in FIG. 1, and an outer position, shown in FIG. 3. It will be recognized that the moment of inertia of the plate 34 about the axis of shaft 44 is directly proportional to the square of the radius of surface 36 when plate 34 is treated as a disc. Likewise, plate 56 has a moment of inertia about shaft 44 that is directly dependent upon its distance from the axis of shaft 44. Since the shaft 44 is located inwardly of the periphery of disc 14 it is seen that the radial dimensions of plates 34 and 56 are at a minimum. In this manner the total moment of inertia and the force required to pivot the plates 34 and 56 about the axis of shaft 44 is at a minimum.

The lower electromagnetic transducer or translator, commonly called a "read-write head" 20, is mounted on the inner corner portion 51 of the lower sector plate 34 so that its pole pieces 24 and 25, which form a longitudinal nonmagnetic slot or gap 26 (shown in FIG. 2 only), are spaced a small but substantially precise distance from the lower surface of the disc or rides upon the surface of the disc (known in the art as "contact recording") in order to translate information from, and onto the lower surface of the disc 14. The upper transducer or translator 21 is mounted on the distal end 59 of the upper mounting plate 56 so that its pole pieces (not shown but comparable to the pole pieces 24 and 25 of transducer 20), which form a longitudinal nonmagnetic slot or gap, are spaced a small but substantially precise distance from the upper surface of the disc, or contact the disc, in order to translate information from, and onto, the upper surface of the disc 14.

Each transducer 20 and 21 is oriented on its associated plate 34 and 56 such that an imaginary straight line B–B′ (not shown) extending longitudinally through its gap is substantially coincident with a straight radius line A–A′ (shown as line 27 in the figures) extending from the axis of the disc 14 to a point midway between the faces of the pole pieces forming the nonmagnetic gap when the plates 34 and 56 are in the innermost position, as shown in FIGS. 1 and 2.

In addition, the aforementioned longitudinal straight line B–B′ through the gap of the transducer is substantially perpendicular to an imaginary line C–C′ (not shown) extending from the axis of pivot shaft 44 to the mentioned midway point between the faces of the pole pieces. It will be understood that when the plates 34 and 56 are in their innermost position as the disc 14 rotates, as illustrated in FIG. 1, the small portion of magnetic material passing immediately beneath the transducers' gaps moves past the gaps at an angle substantially normal to the straight lines A–A′ and B–B′.

As the plates 34 and 56 move outwardly from their inner position to their outer position (FIG. 3), the angle between the straight line C–C′ and the straight line A–A′ becomes smaller, i.e., the transducers (and line B–B′) are skewed with respect to the original line A–A′ as shown in FIG. 3. In effect, the direction of movement past the gaps of the transducers of the small portion of magnetic material directly adjacent the gaps becomes oblique with respect to the longitudinal dimension of the gaps (line B–B′). It will be recognized, that skewing of the transducers, and their gaps, will result in weaker electrical signals being induced in the transducers if the speed of the magnetic material passing adjacent the transducers is the same regardless of the amount of transducer skewing. But, in the present invention, the increase in strength of the electrical signals induced in the transducers, due to the increase in the speed of the magnetic material passing adjacent the transducers as the plates 34 and 56 progressively move outwardly, is offset or compensated by the decrease in induced signal strength due to skewing of the transducers. Thus, it can be understood that the present invention provides for inducing substantially constant strength electrical signals in a transducer and magnetic disc combination.

It is to be further noted that the radial width of the portion of magnetic material immediately adjacent the gaps of the transducers becomes progressively smaller as the transducers are moved radially outward due to the mentioned skewing of the transducers. As shown in FIGS. 1 and 3, the magnetic material on the upper and lower surfaces of the disc that is moved past the transducers when in their outermost position, describes a relatively narrow outer data track 32, as compared with the relatively wide inner data track 28. Thus, it can be understood that the center-to-center radial spacing between adjacent areas or tracks progressively closer to the outer periphery of the disc becomes progressively less than the center-to-center radial spacing between adjacent tracks near the inner portion of the disc.

The pivoted mounting of the sector plate 34 has an additional advantage of providing for automatic positioning or indexing of the transducers 20 and 21 so that the center-to-center spacing between adjacent areas or tracks of the magnetic material moved past the transducers is progressively smaller as the sector plate 34 moves toward its outer position. When the plate 34 is near its outer position (near the outer data track 32), a unit angular pivoting or movement of the plate 34 will move or displace the transducers radially, with respect to the center of the disc 14, by an amount less than the radial movement or displacement of the transducers resulting from a unit angular pivoting of the plate 34 near its inner position (near the inner data track). This may be more readily understood when it is recognized that at any instantaneous position of the plate 34, the distance or length of radius line A–A′ from the transducers to the center of the disc 14, is a function of the sine of the angle between the extreme inner position (0° position) and the instantaneous position, and that the change in length of said radius line A–A′ per unit angular change in movement of the plate 34 is proportional to the cosine of the angle between line A–A′ and the instantaneous position of previously mentioned line C–C′.

The capstan 22, and associated sructural elements to be described, provide a means for rapidly and accurately indexing or positioning plates 34 and 56 with respect to the center of the disc 14. The capstan 22 is mounted on a shaft 62 which is rotatable about an axis parallel to the pivot axis of sector plate 34 and disposed outwardly of the periphery of the disc 14. Shaft 62 is suitably interconnected with a convenient source of power for selective controlled angular movement about its axis, such as a stepping motor 63 (shown only in FIG. 1). An inner idler roller 64 rotatable about an axis parallel with the axis of shaft 62 is suitably mounted on the base 12 at a point below the disc 14 and to one side of a straight line between the axes of shafts 44 and 62. An outer idler roller 66 is rotatably mounted on one end of a pivot arm 67 which is pivotally mounted on the base 12 by means of a shaft 69. A tension spring 73, attached between the arm 67 and base 12, biases the outer roller 66 counter-clockwise, as viewed in FIG. 1, about shaft 69.

One end of a substantially inextensible but flexible band 68 is attached to one side of capstan 22 and is trained thereabout in the clockwise direction (as viewed from above in the figures) over inner idler roller 64 in the clockwise direction, and over the curved surface 36 of the lower sector plate 34 in the counter-clockwise direction to a band-connecting means 70. Likewise, one end of another substantially inextensible but flexible band 72 is secured to one side of capstan 22 and trained thereabout below the band 68 in the counter-clockwise direction, over the outer idler roller 66 in the counter-clockwise direction, and over the curved surface 36 of the sector plate 34 below the band 68 in the clockwise direction to an attachment or connecting means 74.

In FIG. 4, the connecting means 70 is shown as a narrow-necked opening 71 formed in the sidewall 38 and a small screw 76 threadedly engaged in a suitable threaded bore which extends between the narrow-necked opening and the exterior of the sidewall 38. One end of the band 68 is fixed to a small slug-like member 78, which is then inserted into the narrow-necked opening so that the band extends outwardly therefrom. Attachment means 74 is like attachment means 70 heretofore described, and one end of the other flexible band 72 is maintained in the connecting means 74 in a manner like that described for band 68. The other ends of both of the flexible bands 68 and 72 may be attached to the capstan 22 by means similar to that described for the sector plate connecting means 70 and 74, or other suitable means may be employed. The force of biasing spring 73 will provide tension in the bands 68 and 72.

By means of the interconnecting bands 68 and 72, selective pivoting of the capstan 22 in either direction about its axis will result in pivoting of the sector plates 34 and 56 about the axis of shaft 44 in a direction opposite to that of the capstan. The amount or angular extent of pivoting of the sector plates 38 and 56 will be proportional to the product of the amount of angular rotation of capstan 22 and the ratio of the radius of the capstan to the radius of curvature of the curved surface 36. For example, if the radius of curvature of the curved surface 36 is twice the radius of the capstan 22, one degree of angular movement of capstan 22 about its axis will effect one-half degree of angular movement of plates 34 and 56 about shaft 44.

It is to be noted that the tensions in the bands 68 and 72 respectively, act in directions opposite to each other at both the capstan 22 and the sector plate 38, thus very firmly interconnecting the capstan 22 with the sector plate 38 in a manner that obviates backlash or free play. It is to be also noted that in the embodiment shown and described, those portions of bands 68 and 72 that extend from the idler rollers to the curved surface 36 are both disposed substantially in the same vertical plane parallel to the axis of shaft 44 and thus do not impose any radial thrust on the shaft 44. In this manner, wear on the shaft is reduced and very easy and rapid positioning of the plates 34 and 56 is enhanced.

If desired, the curved surface 36 of the lower sector plate 34 or the curvature of the capstan 22 or both, may be formed so that a degree of angular movement of the capstan 22 will result in differing degrees of angular movement of the sector plates 34 and 56, depending upon the initial position and direction of movement of the capstan. For example, the curved surface 36 may describe the involute of a circle. It will be recognized that, as the sector plate 34 moves, the bands 68 and 72 will be tangent to the involute at succeedingly different points and those succeedingly different points will have succeedingly different radii of curvature. The differing radii of curvature will effect different angular movements of the sector plate 34 for the same unit angular movement of the capstan 22.

In operation, the stepping motor 63 is generally pulsed by electrical signals from an outside source, such as, for example, an electronic data processor, to cause angular movement of the capstan 22 by certain predetermined amounts, thereby effecting a predetermined amount of angular movement of the plates 34 and 56 and thus rapidly and accurately positioning the transducers 20 and 21 in predetermined desired translating positions with respect to the area of the disc 14.

What is claimed is:

1. In an information handling apparatus having an information storage medium mounted for rotation about a first axis extending substantially perpendicular to said medium, information being received and stored on said medium in a plurality of curved tracks, the center of curvature of said tracks being coincident with said first axis; said medium having a predetermined radial dimension, and means for translating information to and from said medium;

an improved means for mounting said translating means in information translating relation with said medium;

said mounting means being pivotable about a second axis disposed substantially parallel with said first axis between a first position wherein said translating means is at a first translating location disposed a first radial distance from said center of curvature, and a second position wherein said translating means is at a second translating location disposed a second radial distance from said center of curvature, said second axis being spaced from said first axis by a distance less than the radial dimension of said medium, and means engageable with said mounting means for selectively pivoting said mounting means between said first and second positions;

said translating means includes members defining a generally longitudinal gap;

said mounting means being pivotable in a predetermined path of travel wherein said gap is skewed with respect to a straight line passing through said center of curvature and the center of said gap as said mounting means is pivoted between said first position and said second position.

2. In an information handling apparatus according to claim 1 wherein said mounting means is arranged so that said gap is disposed at an angle of substantially zero degree with said straight line when said mounting means is in said first position.

3. In an information handling apparatus according to claim 1 wherein said mounting means is arranged so that said gap is disposed at an acute angle with respect to said straight line when said mounting means is in one of said positions, and said angle decreases as said mounting means moves to the other one of said positions.

4. In an information handling apparatus including a generally circular shaped information storage medium, having a substantially flat surfaced magnetic body mounted for rotation about a first axis extending through the center of said medium and perpendicular to said medium, transducer means for translating information relative to said body, said transducer means having means defining a longitudinal transducer gap having a fixed width and length, an improved means for mounting said transducer means in operative relation with said surface and for indexing said transducer means in translating relation with said body, said mounting and indexing means being adapted to receive said transducer means and maintain said transducer gap forming means in translating relation adjacent said surface, curved information receiving and storing tracks having a center of curvature coincident with said first axis being defined by the area of said surface of said body that passes immediately adjacent said transducer gap as said medium rotates, the radial width of said curved tracks being defined by the radial width of said transducer gap with respect to said first axis;

said mounting and indexing means including means for pivoting said transducer means about a second axis between a first position wherein said transducer gap has a first radial width with respect to said first axis, and a second position wherein said transducer gap has a second radial width with respect to said first axis, said first radial width being spaced closer to said first axis than said second radial width, said first radial width being larger than said second radial width;

drive means responsive to electrical signals for selective angular movement about a third axis; and a pair of substantially inextensible and flexible members connected between said drive means and said mounting and indexing means, said members being responsive to angular movement of said drive means for effecting selective pivoting of said mounting and indexing means between said first and second positions.

5. In an information handling apparatus according to claim 4 wherein said first and second positions define a range of pivoting of said mounting and indexing means, said drive means being responsive to individual ones of said electrical signals for angular movement of a predetermined amount, said members being responsive to said predetermined amount of angular movement of said drive means to effect a predetermined amount of pivoting of said mounting and indexing means within said range of pivoting, pivoting of said mounting and indexing means through said range effecting movement of said transducer means in a predetermined path of travel, said path of travel having a first end and a second end, said first end being disposed closer to said first axis than said second end, said mounting and indexing means arranged and adapted to move said transducer means in said path of travel by successively different radial amounts with respect to said first axis in response to successive angular movements of said mounting and indexing means.

6. In an information handling apparatus including a generally circular shaped information storage medium having a substantially flat surfaced magnetic body mounted for rotation about a first axis extending through the center of said medium and perpendicular to said medium;

transducer means for translating information relative to said body, said translating means having means defining a longitudinal transducer gap having a fixed width and length;

an improved means for mounting said transducer means in operative relation with said surface and for indexing said transducer means in translating relation with said body, said mounting and indexing means being adapted to receive said transducer means and maintain said transducer gap forming means in translating relation with the surface of said body, curved information receiving and storing tracks having a center of curvature coincident with said first axis being defined by the area of said surface of said body that passes immediately adjacent said transducer gap as said medium rotates, the radial width of said curved tracks being defined by the radial width of said transducer gap with respect to said first axis;

said mounting and indexing means including means for pivoting said transducer means about a second axis between a first position wherein said transducer gap has a first radial width with respect to said first axis, and a second position wherein said transducer gap has a second radial width with respect to said first axis, said first radial width being spaced closer to said first axis than said second radial width, said first radial width being larger than said second radial width; and drive means responsive to electrical signals for effecting selective pivoting of said mounting and indexing means between said first and second positions.

References Cited

UNITED STATES PATENTS

| | | | |
|---|---|---|---|
| 2,579,659 | 12/1951 | Fisher | 74—10.7 |
| 3,384,880 | 5/1968 | Duinker et al. | 340—174.1 |

FOREIGN PATENTS

| | | |
|---|---|---|
| 975,979 | 11/1964 | Great Britain. |

BERNARD KONICK, Primary Examiner

WILLIAM F. WHITE, Assistant Examiner

U.S. Cl. X.R.

179—100.2; 274—4